(12) United States Patent
Skinner (10) Patent No.: US 6,661,920 B1
(45) Date of Patent: Dec. 9, 2003

(54) METHOD AND APPARATUS FOR MULTIPLE SIMULTANEOUSLY ACTIVE DATA ENTRY MECHANISMS ON A COMPUTER SYSTEM

(75) Inventor: Craig Stuart Skinner, Snohomish, WA (US)

(73) Assignee: Palm Inc., Santa Clara, CA (US)

( * ) Notice: Subject to any disclaimer, the term of this patent is extended or adjusted under 35 U.S.C. 154(b) by 0 days.

(21) Appl. No.: 09/487,552

(22) Filed: Jan. 19, 2000

(51) Int. Cl.[7] .................................................. G06K 9/00
(52) U.S. Cl. ........................ 382/187; 382/189; 382/314; 345/169; 715/541
(58) Field of Search ........................ 382/181, 186–189, 382/313, 314, 202; 345/169, 173, 179, 156; 455/556.2; 715/506–508, 530, 541

(56) References Cited

U.S. PATENT DOCUMENTS

| | | | | |
|---|---|---|---|---|
| 5,561,446 A | * | 10/1996 | Montlick ..................... | 345/173 |
| 5,566,098 A | * | 10/1996 | Lucente et al. ............. | 361/681 |
| 5,644,653 A | * | 7/1997 | Sunakawa et al. .......... | 382/187 |
| 5,799,107 A | * | 8/1998 | Fukuchi ...................... | 382/181 |
| 5,812,117 A | * | 9/1998 | Moon .......................... | 345/169 |
| 5,812,697 A | * | 9/1998 | Sakai et al. ................. | 382/186 |
| 5,881,169 A | * | 3/1999 | Henry, Jr. ................... | 382/187 |
| 5,956,423 A | * | 9/1999 | Frink et al. ................. | 382/187 |
| 6,002,390 A | * | 12/1999 | Masui ......................... | 345/173 |
| 6,193,152 B1 | * | 2/2001 | Fernando et al. ........... | 235/380 |
| 6,212,297 B1 | * | 4/2001 | Sklarew ...................... | 382/189 |
| 6,292,181 B1 | * | 9/2001 | Banerjee et al. ............ | 345/179 |
| 6,487,569 B1 | * | 11/2002 | Lui et al. .................... | 715/541 |

OTHER PUBLICATIONS

Schomaker "From handwriting analysis to pen–computer applications", Electronics & Communication Engineering Journal, pp. 93–102, Jun. 1998.*

Hashimoto, et al. "A virtual keyboard and a vector input method for pen–based character input", ACM, pp. 254, pp. 254–255, 1995.*

* cited by examiner

*Primary Examiner*—Daniel G. Mariam
(74) *Attorney, Agent, or Firm*—Wagner, Murabito & Hao LLP (57) ABSTRACT

A method and system providing simultaneous data entry for a computer system having both on-screen keyboard entry and mechanisms for handwriting recognition entry. In one embodiment, a portable or palmtop computer system contains a flat panel display screen capable of displaying thereon a keyboard image ("virtual keyboard"). Characters can be entered into the computer system by a user interacting with (e.g., tapping) the displayed characters of the virtual keyboard. The computer system also provides a handwriting recognition mechanism (e.g., digitizer pad) whereby characters are recognized based on a user drawing strokes on the pad. In accordance with the present invention, the virtual keyboard and the handwriting recognition mechanism are simultaneously active for data entry. Therefore, the computer system can accept character entry from the handwriting recognition mechanism while the virtual keyboard is displayed and active and capable of providing character entry itself. Specifically, from the virtual keyboard, the user is allowed to either tap the individual buttons, representing characters, on the screen to enter data or the user can enter data via the handwriting recognition mechanism. Since both methods are active simultaneously, the user does not have to switch between them. The present invention gives a user increased flexibility in the manual entry of characters to the computer system.

19 Claims, 10 Drawing Sheets

METHOD AND APPARATUS FOR MULTIPLE SIMULTANEOUSLY ACTIVE DATA ENTRY MECHANISMS ON A COMPUTER SYSTEM

BACKGROUND OF THE INVENTION

1. Field of the Invention

The present invention relates to the field of data entry methods and systems for computer systems. The present invention can relate to the field of palmtop computers and handwriting recognition systems. Specifically, the present invention discloses a flexible data input system that can accept data from simultaneously active systems including a handwriting recognition system and a virtual keyboard system.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

Since palmtop computer systems are very small, full-sized keyboards are generally not efficient input devices. Palmtop computers using keyboards have keyboard devices that are so small that a user cannot touch-type. Furthermore, to use a keyboard device, a user must either place the palmtop computer system down onto a flat surface, so the user can type with both hands, or the user holds the palmtop computer system with two hands and types with thumbs only.

Instead of a keyboard device, some palmtop computers utilize a touch screen and display an image of a small keyboard thereon. When a particular button is pressed or tapped, a small keyboard image is displayed on the display screen. The user then interacts with the on-screen small keyboard image to enter characters, usually one character at a time. To interact with the displayed keyboard image, the user taps the screen location of a character with a pen. That corresponding character is then recognized and added to a data entry field, also displayed on the screen.

Instead of using a keyboard device or a displayed keyboard, many palmtop computers employ a pen and a digitizer pad as an input system. The pen and digitizer pad combination works well for palmtop computers because the arrangement allows a user to hold the palmtop computer system in one hand while writing with the pen onto the digitizer pad with the other hand.

A number of palmtop computer systems that rely on the pen and digitizer pad combination as the primary means of input have been introduced to the market. Most of these pen-based palmtop computer systems provide some type of handwriting recognition system whereby the user can write words and letters on the digitizer pad with a stylus. The palmtop computer system then converts the user's handwriting into a machine readable format such as ASCII code characters. Examples of pen-based palmtop computer systems that provide handwriting recognition include the Apple Newton (trademark) device and the Tandy Zoomer (trademark) device.

Consumer acceptance of many pen based palmtop computer systems has been limited due to the poor performance of handwriting recognition systems. When a human reads a handwritten message, the human uses various clues to decipher the handwriting such as the known spelling of words, the known subject of the message, the writer's character writing style, and knowledge of English grammar. Since it is very difficult to teach a computer system all these subtle handwriting recognition heuristics, most handwriting recognition systems only rely on the writer's input strokes and a dictionary of common words. Using such limited information, such handwriting recognition systems often yield inaccurate results.

Some handwriting recognition techniques divide the recognition task into steps for identifying individual characters. Another handwriting recognition system is described in U.S. Pat. No. 5,889,888, issued on Mar. 30, 1999 entitled, "Method and Apparatus for Immediate Response Handwriting Recognition System that Handles Multiple Character Sets." This character recognition system recognizes a large number of different characters with less effort on the user's part (e.g., fewer "mode change" strokes). This US patent is incorporated herein by reference.

Some palmtop computer systems have been introduced that utilize both the handwriting recognition system, as described above, and also have the capability of generating a displayed keyboard. However, these computer systems allow only one means of input to be active at any time. For instance, if the user is entering characters using the handwriting recognition mechanisms, then the on-screen keyboard is not displayed and is not active. Moreover, if the on-screen keyboard image is displayed, then the handwriting recognition mechanisms are disabled. As a result, current palmtop computer systems can be relatively inflexible in the ways in which data is manually entered from a user standpoint. This is particularly disadvantageous for experienced users that interact well with the handwriting recognition system. It would be advantageous, then, to provide a more flexible user data entry system for palmtop computer systems.

SUMMARY OF THE INVENTION

Accordingly, what is needed is a flexible mechanism and process for entering character data into a palmtop computer system. An embodiment of the present invention provides a data entry system wherein a handwriting recognition mechanism and an on-screen virtual keyboard are simultaneously active and capable of data entry. Since both methods are active simultaneously, the user does not have to switch between them. The present invention gives a user increased flexibility in the manual entry of characters to the palmtop computer system. The present invention provides these advantages and others not specifically mentioned above but described in the sections to follow.

A method and system are described for providing simultaneous data entry for a computer system having both on-screen keyboard entry and mechanisms for handwriting recognition entry. In one embodiment, a portable or palmtop computer system contains a flat panel display screen capable of displaying thereon a keyboard image ("virtual keyboard"). Characters can be entered into the computer system by a user interacting with (e.g., tapping) the displayed characters of the virtual keyboard. The computer system also provides a handwriting recognition mechanism (e.g., digitizer pad) whereby characters are recognized based on a user drawing strokes on the pad. In accordance with the present invention, the virtual keyboard and the handwriting recognition mechanism are simultaneously active for data entry. Therefore, the computer system can accept character entry from the handwriting recognition mechanism while the virtual keyboard is displayed and active and capable of providing character entry itself. Specifically, from the virtual keyboard, the user is allowed to either tap the individual buttons, representing characters, on the screen to enter data or the user can enter data via the handwriting recognition mechanism. Since both methods are active simultaneously, the user does not have to switch between them. The present invention gives the user increased flexibility in the manual entry of characters to the computer system.

More specifically, an embodiment of the present invention includes a computer system comprising a processor coupled to a bus; a screen coupled to the bus and for displaying thereon a virtual keyboard image, the virtual keyboard image comprising characters and a first data entry field, the screen also for registering selection of a first character in response to a stylus contacting a screen location displaying the first character; and a handwriting recognition pad coupled to the bus and for providing information to the processor for recognizing a second character in response to the stylus being stroked on the handwriting recognition pad wherein the handwriting recognition pad and the virtual keyboard image are both simultaneously active for accepting manual data entry and wherein the first and second characters are displayed in the first data entry field. Embodiments include the above and wherein the computer system is a portable computer system.

Embodiments include the above and wherein the screen is a flat panel display screen and wherein further the handwriting recognition pad comprises a button for causing the screen to display the virtual keyboard image in response to being tapped by the stylus. Embodiments include the above and wherein the handwriting recognition pad comprises: a first region upon which the stylus draws alphabetic characters for recognition by the processor; and a second region upon which the stylus draws numeric characters for recognition by the processor.

DETAILED DESCRIPTION OF THE INVENTION

In the following detailed description of the present invention, a portable or hand-held computer system capable of simultaneously accepting manual entered character data from user selection on an on-screen virtual keyboard mechanism and from user interaction with a handwriting recognition mechanism, numerous specific details are set forth in order to provide a thorough understanding of the present invention. However, it will be recognized by one skilled in the art that the present invention may be practiced without these specific details or with equivalents thereof. In other instances well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

MULTIPLE SIMULTANEOUSLY ACTIVE DATA ENTRY MEANS IN ACCORDANCE WITH THE PRESENT INVENTION

Figure 1:
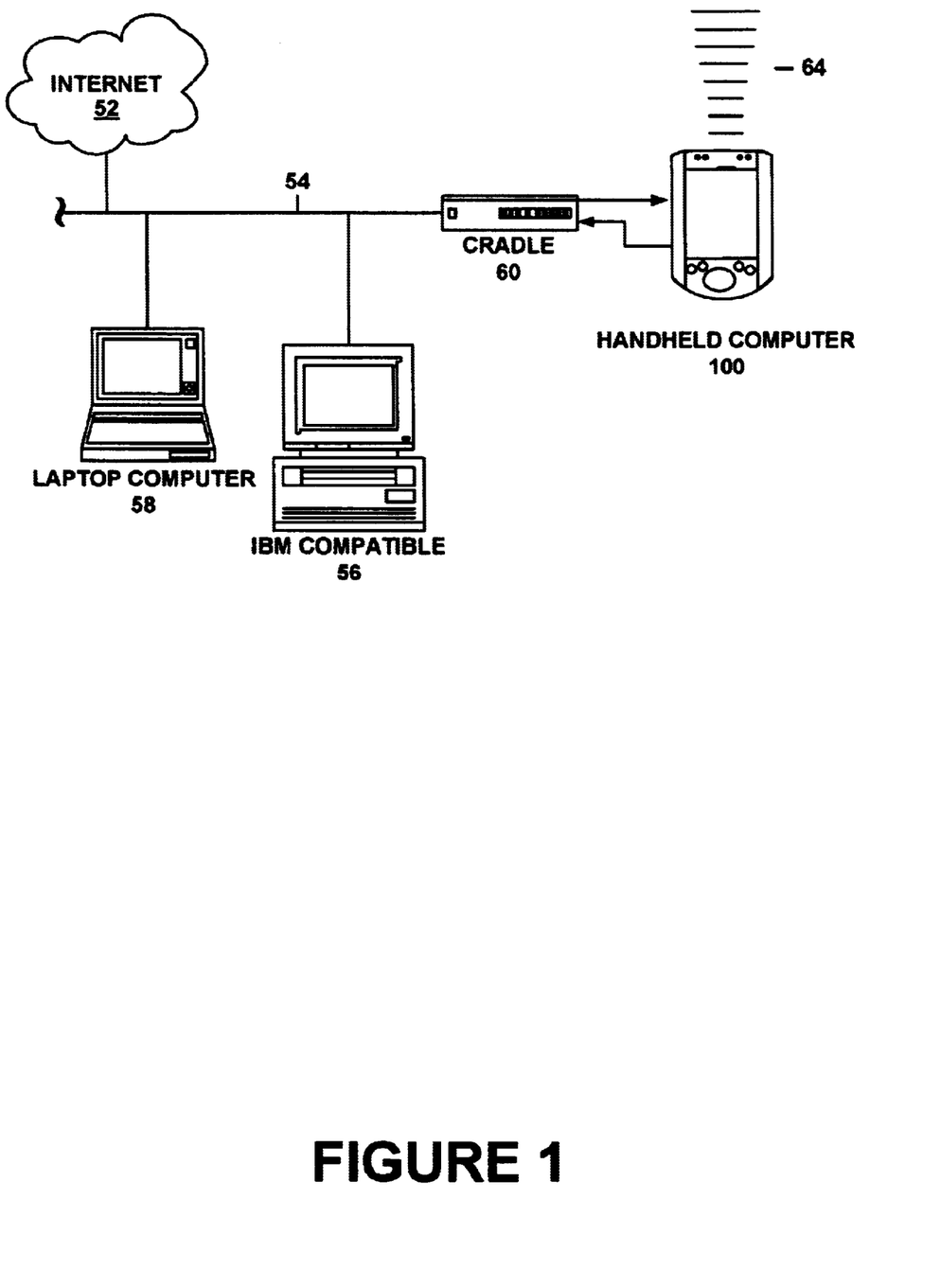
FIG. 1 is system illustration of a palmtop computer system connected to other computer systems and the Internet via a cradle device.

FIG. 1 illustrates a system 50 that can be used in conjunction with the data entry system of the present invention. System 50 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a palmtop ("palm-sized") portable computer system 100 of the present invention. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 2A:
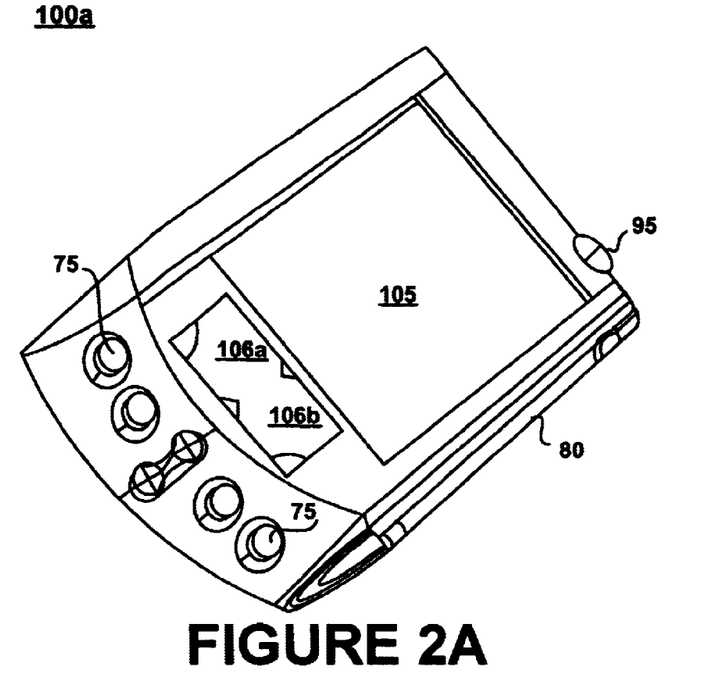
FIG. 2A is a top side perspective view of a palmtop computer system that can be used as a platform for the data entry embodiments of the present invention.

FIG. 2A is a perspective illustration of the top face 100a of one embodiment of the palmtop computer system of the present invention. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

Importantly, FIG. 2A also illustrates a handwriting recognition pad or "digitizer" containing two regions 106a and 106b. Region 106a is for the drawing of alphabetic characters therein for automatic recognition and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 2B:
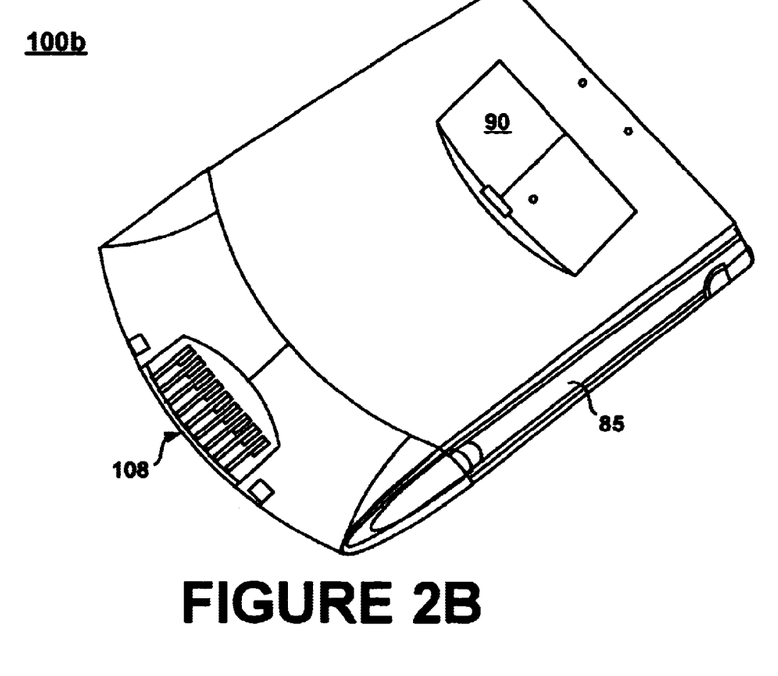
FIG. 2B is a bottom side perspective view of the palmtop computer system of FIG. 2A.

FIG. 2B illustrates the bottom side 100b of one embodiment of the palmtop computer system of the present invention. An optional extendible, antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc.

Figure 3:
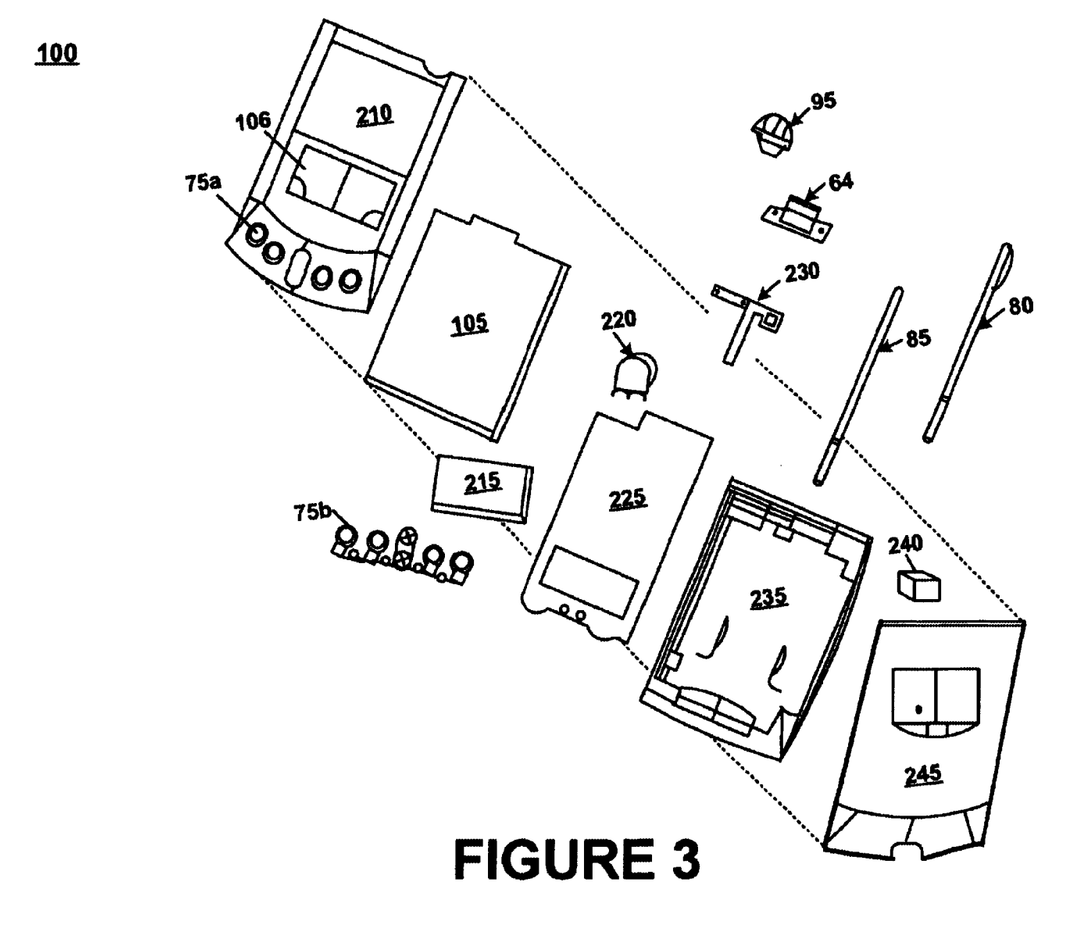
FIG. 3 is an exploded view of the components of the palmtop computer system of FIG. 2A.

FIG. 3 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation the Mobitex wireless communication system is used to provide two way communication between system 100 and other networked computers and/or the Internet via a proxy server.

Figure 4:
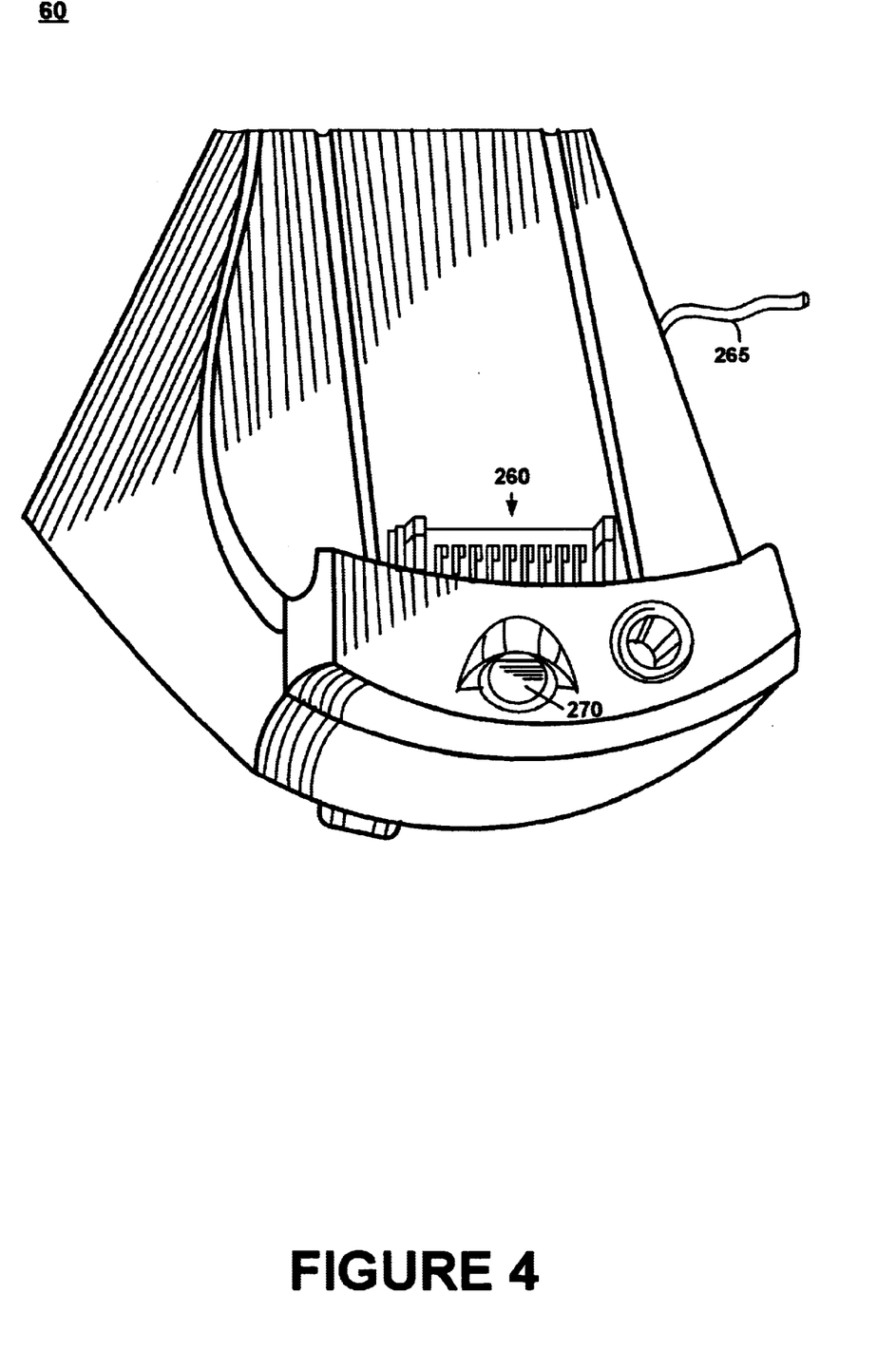
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Figure 5:
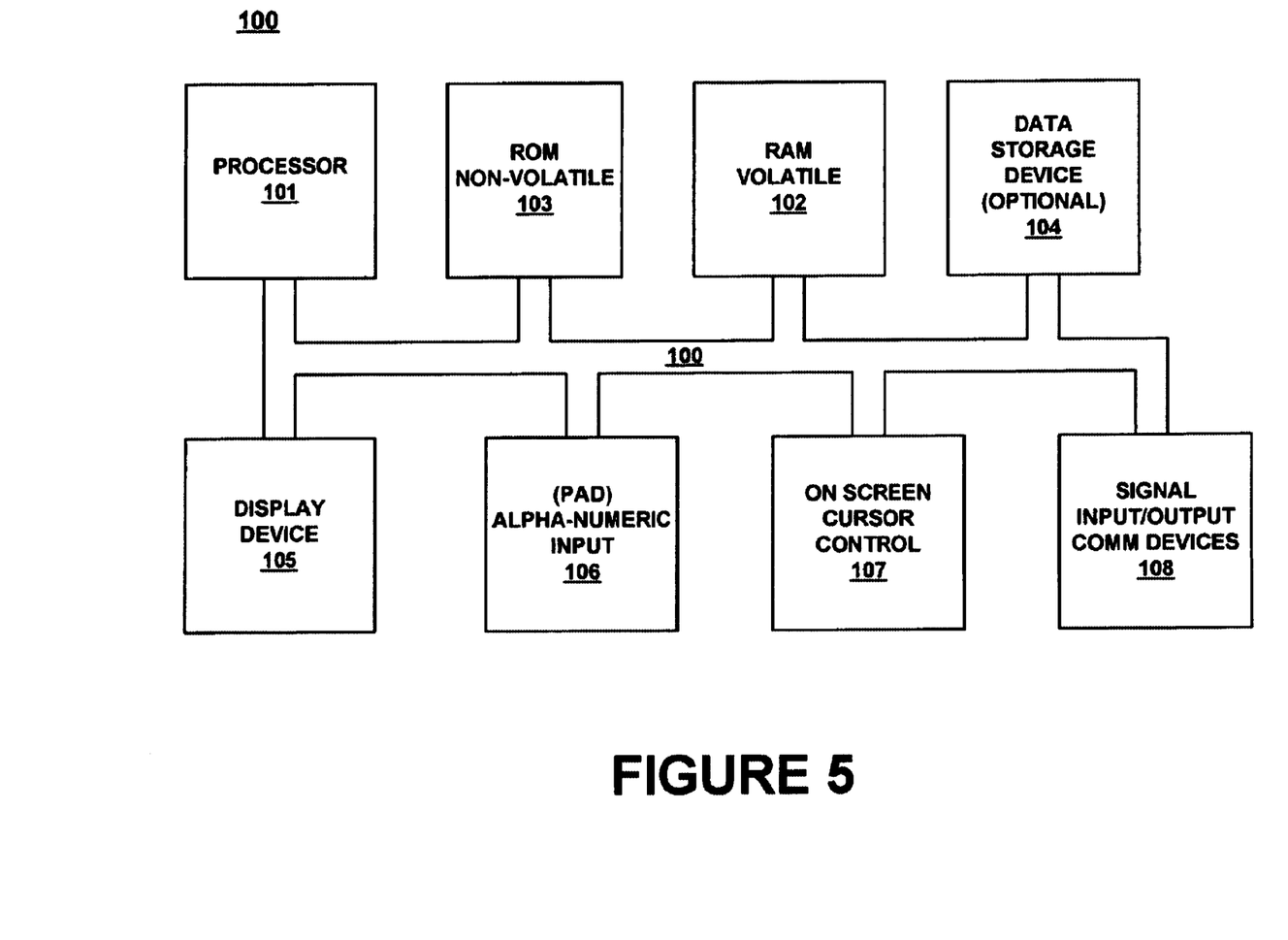
FIG. 5 is a logical block diagram of the palmtop computer system in accordance with an embodiment of the present invention.

FIG. 5 illustrates circuitry of computer system 100, some of which can be implemented on PC board 225. Computer system 100 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 110 also includes an optional data storage device 104 (e.g., memory stick) coupled with the bus 100 for storing information and instructions. Device 104 can be removable. As described above, system 100 also contains a display device 105 coupled to the bus 100 for displaying information to the computer user. PC board 225 can contain the processor 101, the bus 100, the ROM 103 and the RAM 102.

Also included in computer system 110 of FIG. 5 is an optional alphanumeric input device 106 which in one implementation is a handwriting recognition pad ("digitizer") having regions 106a and 106b (FIG. 2A), for instance. Device 106 can communicate information and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 110 may be a liquid crystal device, cathode ray tube (CRT), field emission device (FED, also-called flat panel CRT) or other display device suitable for creating graphic images and alphanumeric characters recognizable to the user. In the preferred embodiment, display 105 is a flat panel display.

Signal communication device 108, also coupled to bus 100, can be a serial port for communicating with the cradle 60. Device 108 can also include an infrared communication port.

Figure 6:
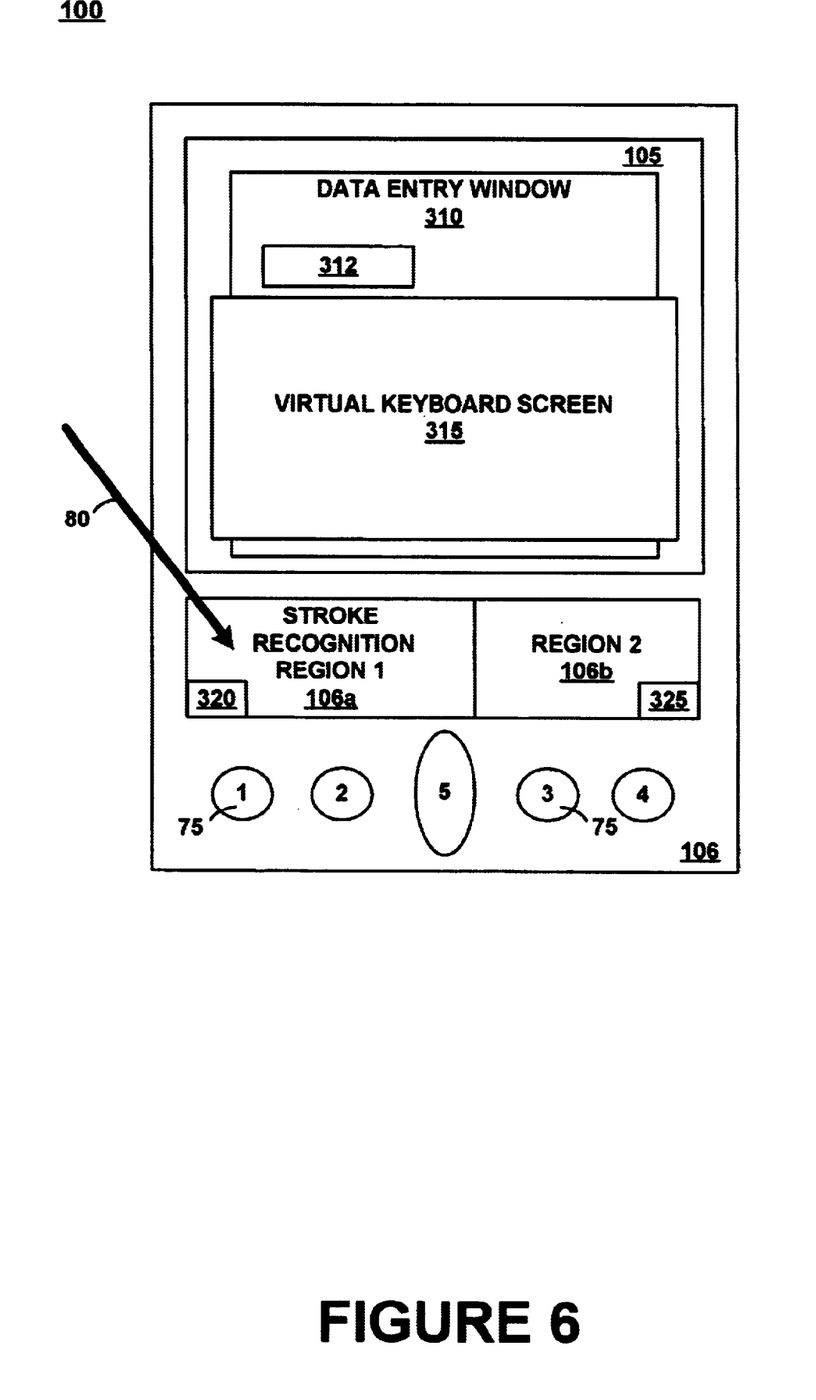
FIG. 6 illustrates a display screen showing a data entry window and a virtual keyboard window and also illustrates a handwriting recognition pad on the palmtop computer system in accordance with embodiments the present invention.

FIG. 6 is a front view of the palmtop computer system 100 with several display windows open on screen 105. An embodiment of the present invention allows a user increased flexibility in the manual entry of characters. The user has the choice of displaying a virtual keyboard image on display 105 and entering characters by selecting one of the displayed characters of the virtual keyboard image. At the same time the virtual keyboard image is displayed, the user can also manually enter characters by using the handwriting recognition pad and stylus 80.

Window 310 is part of a generic application program executing on system 100. Window 310 is a data entry window in that the application program is requesting information to be entered by a user. The information requested and the application program could be any information and any program. In one implementation of the present invention, when the antenna 85 (FIG. 2B) is flipped up by a new user, an information window 310 automatically opens and queues the user to input certain information to identify the user and a user account. This can also cause virtual keyboard window 315 to automatically open also. Alternatively, a security application can be invoked each time the system 100 is turned on. Window 310 (and window 315) would then be automatically displayed to ask for a password from the user. Typically, data entry window 310 has at least one data entry field 312 for accepting character data therein.

When a user taps button 520 or button 325 with the stylus 80, a virtual keyboard window 315 opens on screen 105 along with data entry window 310.

In other embodiments, window 315 can be automatically opened upon an application executing without requiring any other activation or interaction by a user. Virtual keyboard window 315 contains a virtual keyboard image containing a plurality of separate virtual keys, each key representing a character. In the preferred embodiment, window opens over window 310 which can still be viewed partially in FIG. 6. In other embodiments, windows 310 and 315 can be displayed simultaneously in various degrees of partial viewing for either window. While the virtual keyboard image is displayed, if the stylus 80 contacts a virtual key, its character is displayed onto a data entry field on screen 105. In accordance with the present invention, while the virtual keyboard image is displayed, the user can also stroke a character within pad 106 (either region 106a or 106b). The recognized character is then also placed into the displayed data entry field. This process can be repeated.

Importantly, the user can alternate between entering characters using the virtual keyboard image or pad 106 without closing the virtual keyboard window 315. In accordance with the present invention, both the virtual keyboard image and the handwriting recognition pad remain simultaneously active to accept manual characters from a user. This is a particularly useful data entry system because novice users may want to enter data using the virtual keyboard image while other users well acquainted with the handwriting recognition system prefer to use pad 106 for the entry of data. Since the application program generating the data entry window 310 may not be aware of the skill level of the user, offering multiple data entry capabilities, at the same time, is a desired and advantageous feature for system 100.

Figure 7A:
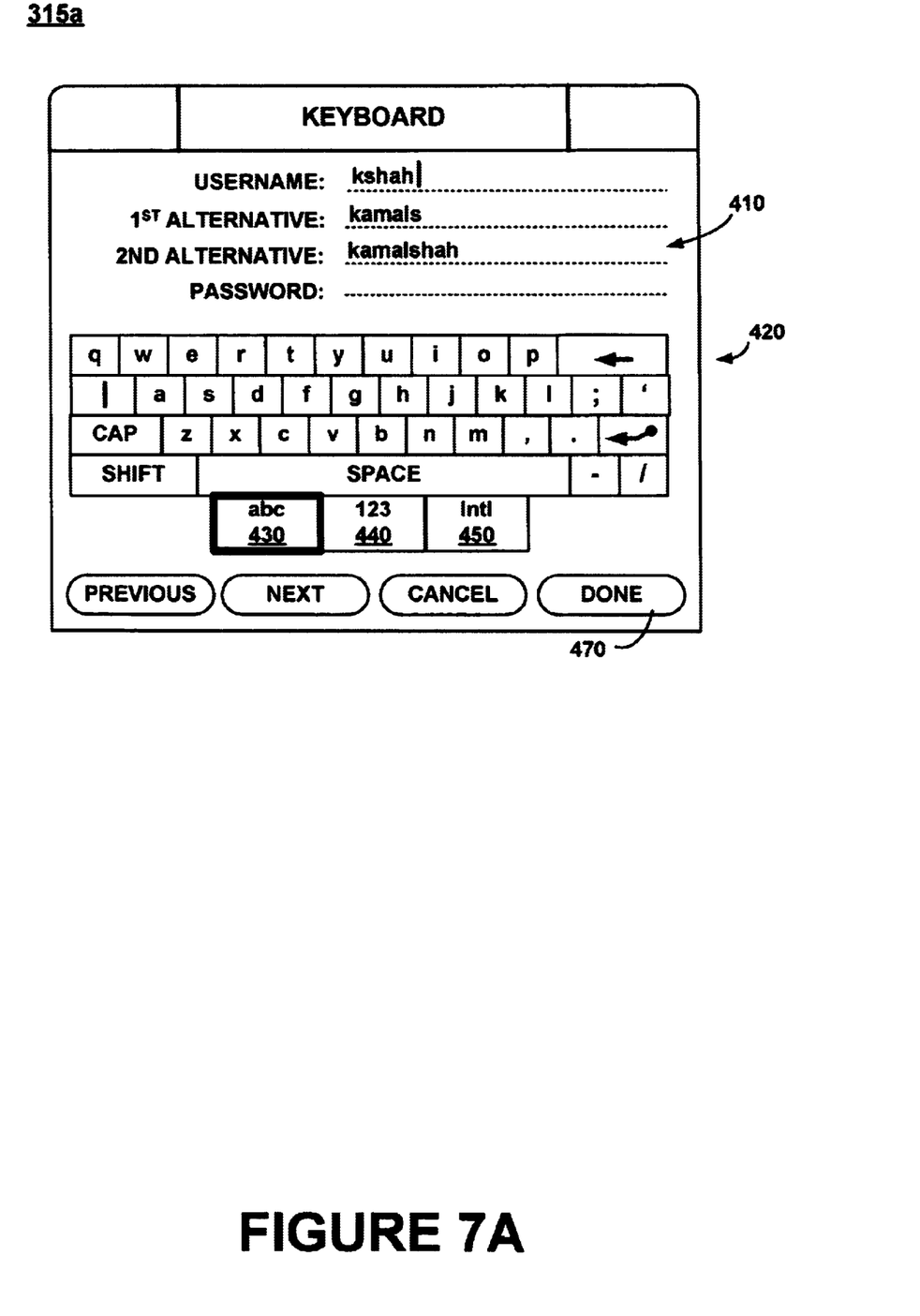
FIG. 7A illustrates an exemplary virtual keyboard image for the entry of alphabetic and other characters by user interaction with the screen of the palmtop computer system.

FIG. 7A illustrates an exemplary keyboard virtual image 315a that can be displayed within window 315 (FIG. 6) when button 320 is activated or when an application automatically causes its display. Keyboard virtual image 315a represents alphabetic characters 420 which are arranged in the familiar QWERTY format of a standard American typewriter. Some punctuation characters and a capital shift key are also provided. Virtual keyboard image 315a also contains its own data entry field 410 for accepting characters. The cursor is currently in the "username" data entry field thereby making this field the active data entry field. It is appreciated that while image 315a is displayed on screen 105, a user can enter data via pad 106 and the recognized characters from the handwriting recognition system will be displayed within the active data entry field 410 (e.g., the one having the cursor associated therewith). Data can then be entered into the active data entry field using either the virtual keyboard image 315a or pad 106 without closing the virtual keyboard window 315 (FIG. 6).

Figure 7B:
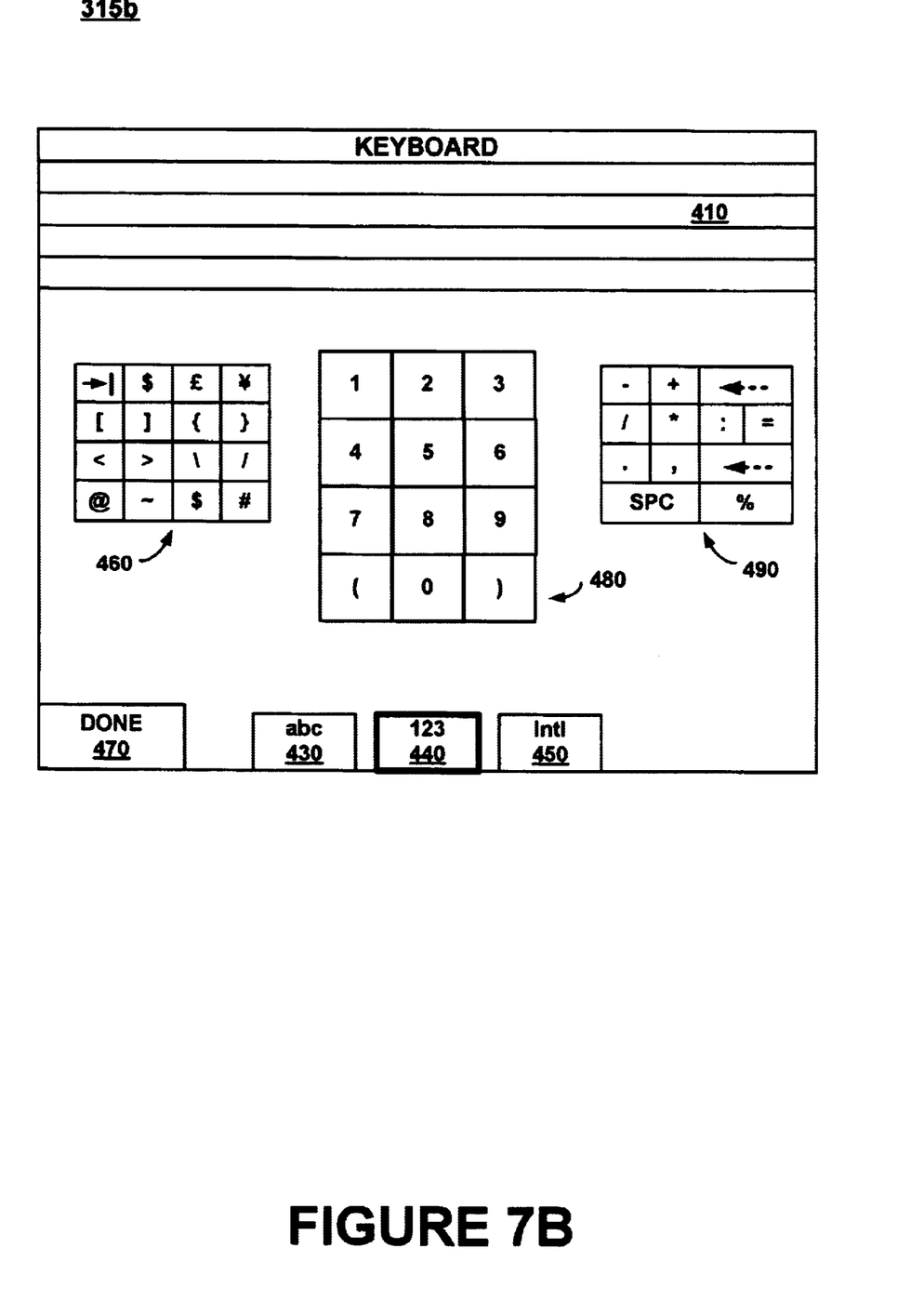
FIG. 7B illustrates an exemplary virtual keyboard image for the entry of numeric and other characters by user interaction with the screen of the palmtop computer system.

FIG. 7B illustrates another virtual keyboard image 315b that can be displayed within window 315. If on screen button 440 (FIG. 7A) is tapped, or if button 325 (FIG. 6) is tapped, then a separate virtual keyboard image 315b is generated representing numeric characters 480 and other punctuation characters 460 and 490. Typically, this virtual keyboard image 315b is displayed within the same screen location as image 315a thereby obscuring image 315a from view or causing image 315a to be removed. If button 430 is tapped, then virtual keyboard image 315a (FIG. 7A) is displayed again. Virtual keyboard image 315b of FIG. 7B contains data entry fields 410 which function in the analogous way as the fields of FIG. 7A. Specifically, data can be entered into the active data entry field 410 of FIG. 7B using either the virtual keyboard image 315b or pad 106 without closing the virtual keyboard window 315 (FIG. 6).

It is appreciated that if button 450 of either image 315a or 315b is selected, then an international virtual keyboard image is selected that is similar to virtual keyboard image 315a except international symbols and punctuation are displayed. The international virtual keyboard image also contains buttons 430, 440 and 450 and optionally a done button 470. Like the numeric keyboard image, the international keyboard image is displayed within the same screen region as image 315a.

It is also appreciated that whenever the on screen done button 470 is selected in either virtual keyboard image 315a or 315b, or the international image, the data contained within the data entry fields is then complete and provided to the application program. In one embodiment, when the done button 470 is selected, any data within the active data entry field of the virtual keyboard window 315 is transferred into the appropriate data entry field 312 of application window 315 (FIG. 6).

Figure 8:
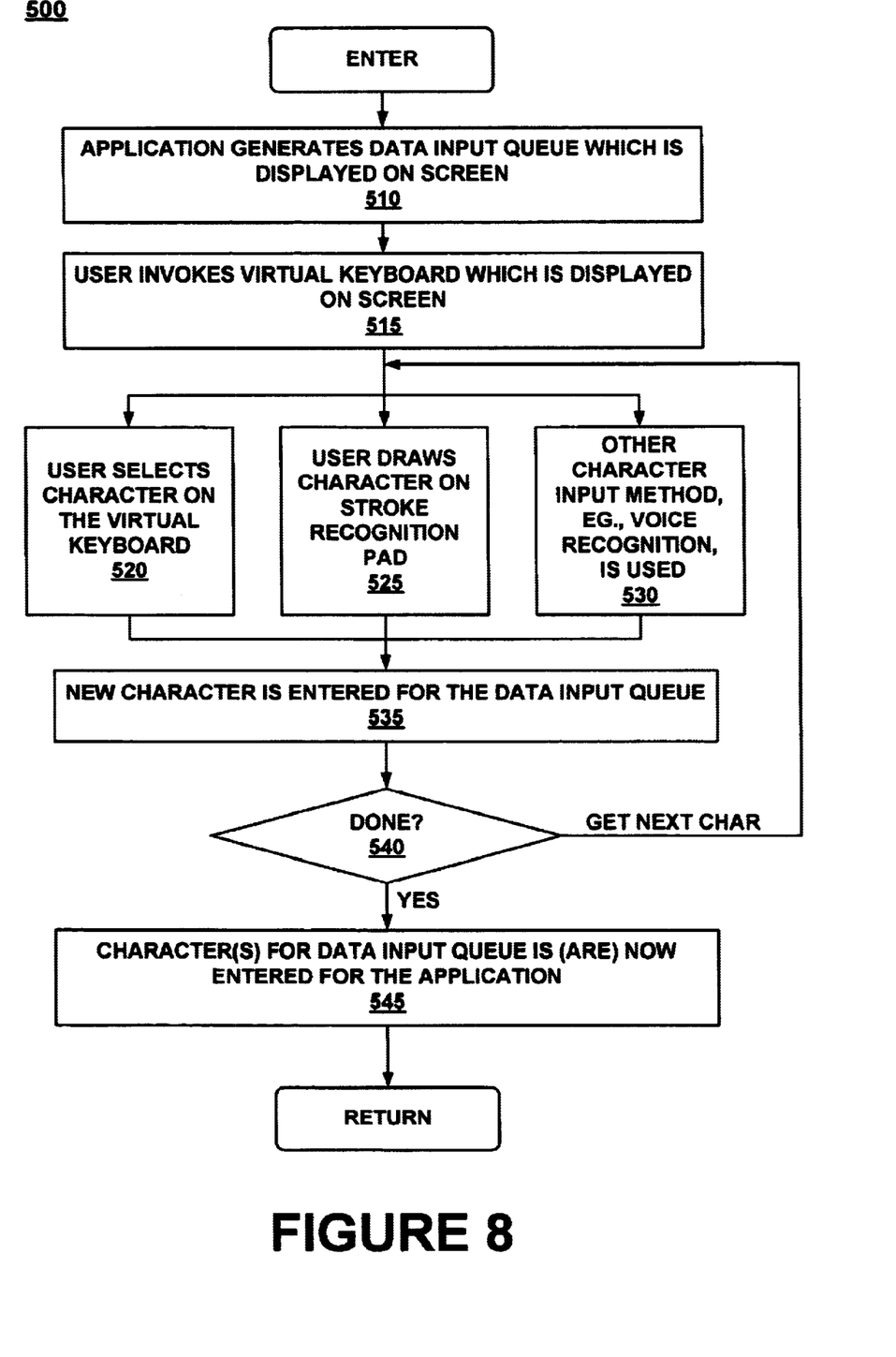
FIG. 8 illustrates a flow diagram of steps of a data entry process in accordance with one embodiment of the present invention.

FIG. 8 is a flow diagram illustrating steps of a generic process 500 in accordance with the present invention for multiple simultaneous active data entry mechanisms for a palmtop computer system. Process 500 can be realized as computer stored instructions that are executed by processor 101. At step 510, an application program generates a window on screen that requests user data to be entered therein. The application window may contain a data entry field or fields (or queue) for receiving this data. At step 515, the user invokes the virtual keyboard window which displays a virtual keyboard image therein. The virtual keyboard window can be invoked by pressing button 320 or 325 (FIG. 6).

Steps 520, 525 and 530 are simultaneously active to receive manually entered character data. At step 520, the user selects a particular character of the virtual keyboard image displayed. This registers a character. Alternatively, while the virtual keyboard image is displayed and active, at step 525, the user can draw or stroke a character on pad 106 causing a character to be recognized. Alternatively, while the virtual keyboard image is displayed and active, at step 530 the user can utilize an alternative form of character entry, such as voice recognition, to enter a new character.

Regardless of the data entry step employed, at step 535, the new character is displayed on screen 105 within the data entry field. In one embodiment, the data entry field is located within the application data input field. In another embodiment, the data entry field is within the virtual keyboard window. At step 540, the process 500 checks if the done key is pressed. If not, then processing returns to steps 520, 525 and 530, which are simultaneously active, to get the next character. Until the done key is pressed, characters can alternatively be entered from the virtual keyboard, from the pad 106 or from voice recognition. If the done key is pressed, then processing enters step 545 where the new characters are entered to the application. If the data entry queue of step 535 is located within the virtual keyboard window, then at step 545 the characters are copied into the data entry queue of the application window. Importantly, the present invention offers multiple simultaneous active data entry mechanisms for increased flexibility and user ease.

Figure 9:
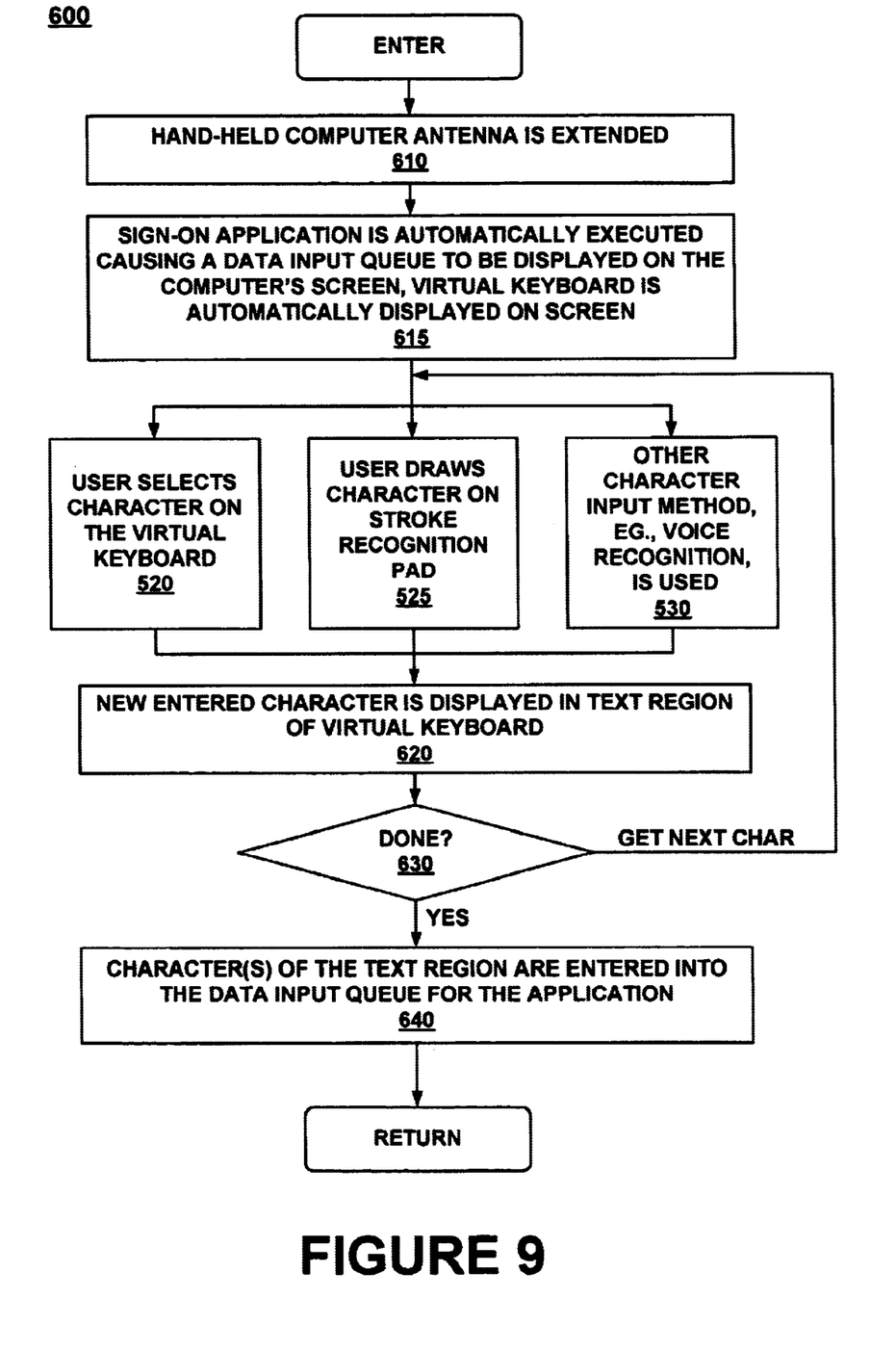
FIG. 9 illustrates a flow diagram of steps of another data entry process in accordance with another embodiment of the present invention.

FIG. 9 illustrates a particular process 600 in accordance with one embodiment of the present invention that is used with a palmtop computer having a wireless connection. Most of the steps of process 600 can be realized as computer stored instructions that are executed by processor 101. At step 610, the antenna on the palmtop computer is raised. This can be done at the first time the unit is employed. This causes, at step 615, a sign-on application program to be invoked. The sign-on application program requests certain user identification and account information to be entered so that wireless communication can be established for the user. At step 615, as part of this process, the virtual keyboard image is displayed on screen 105. This is done because the user may be a novice and not yet familiar with the handwriting recognition process. Steps 520–530 of FIG. 9 are analogous to those described with respect to FIG. 8. Steps 520–530 of FIG. 9 give the same data entry flexibility to the user so that the handwriting recognition features can be used for entering characters while the virtual keyboard image is displayed. This is useful for users that are familiar and more comfortable with the handwriting recognition mechanism of data entry. At step 620, the entered character is displayed in a data entry field of the virtual keyboard window. This process continues to obtain more characters until the done key is pressed and recognized at step 630. Until the done key is pressed, characters can alternatively be entered from the virtual keyboard, from the pad 106 or from voice recognition.

At step 640, the characters of the data input field of the virtual keyboard window are copied into the sign-on application. The data entry process can then be repeated for other fields of the sign-on application.

The preferred embodiment of the present invention, a portable or hand-held computer system capable of simultaneously accepting manual entered character data from user selection on an on-screen virtual keyboard mechanism and from user interaction with a handwriting recognition mechanism, is thus described. While the present invention has been described in particular embodiments, it should be appreciated that the present invention should not be construed as limited by such embodiments, but rather construed according to the below claims.

What is claimed is:

1. A computer system comprising:
   a processor coupled to a bus;
   a screen coupled to said bus and for displaying thereon a virtual keyboard image and a data entry field, said virtual keyboard image comprising characters and wherein said screen is also for registering selection of a particular character in response to a stylus contacting a screen location displaying said particular character and for automatically placing said particular character into said data entry field; and
   a handwriting recognition pad coupled to said bus and for providing information to said processor for recognizing a character in response to said stylus being stroked on said handwriting recognition pad, wherein said character is automatically placed in said data entry field and wherein said handwriting recognition pad and said virtual keyboard image are both simultaneously and independently active for accepting manual data entry.

2. A computer system as described in claim 1 wherein said computer system is a portable computer system.

3. A computer system as described in claim 1 wherein said computer system is a battery powered computer system.

4. A computer system as described in claim 1 wherein said computer system is a palm sized computer system.

5. A computer system as described in claim 1 wherein said handwriting recognition pad comprises a button to display said virtual keyboard in response to being tapped by said stylus.

6. A computer system as described in claim 1 wherein said handwriting recognition pad comprises:
   a first region upon which said stylus draws alphabetic characters for recognition by said processor; and
   a second region upon which said stylus draws numeric characters for recognition by said processor.

7. A computer system comprising:
   a processor coupled to a bus;
   a screen coupled to said bus and for displaying thereon a virtual keyboard image and a first data entry field, said virtual keyboard image comprising characters, said screen also for registering selection of a first character in response to a stylus contacting a screen location displaying said first character; and
   a handwriting recognition pad coupled to said bus and for providing information to said processor for recognizing a second character in response to said stylus being stroked on said handwriting recognition pad wherein said handwriting recognition pad and said virtual keyboard image are both simultaneously and independently active for accepting manual data entry and wherein said first and second characters are automatically displayed in said first data entry field.

8. A computer system as described in claim 7 wherein said computer system is a portable computer system.

9. A computer system as described in claim 7 wherein said computer system is a battery powered computer system.

10. A computer system as described in claim 7 wherein said computer system is a palm sized computer system.

11. A computer system as described in claim 7 wherein said screen is a flat panel display screen and wherein further said handwriting recognition pad comprises a button to display said virtual keyboard in response to being tapped by said stylus.

12. A computer system as described in claim 7 wherein said handwriting recognition pad comprises:
   a first region upon which said stylus draws alphabetic characters for recognition by said processor; and
   a second region upon which said stylus draws numeric characters for recognition by said processor.

13. A computer system as described in claim 7 further comprising an application program for generating a second data entry field and wherein said first and second characters from said first data entry field are transferred into aid second data entry field in response to a user action.

14. In a computer system, a method of accepting manually entered characters comprising:
   a) displaying a virtual keyboard image on a display screen, said virtual keyboard image comprising characters and a first data entry field;

b) registering selection of a first character in response to a stylus contacting a screen location displaying said first character and automatically displaying said first character within said first data entry field;

c) recognizing a second character in response to said stylus being stroked on a handwriting recognition pad and automatically displaying said second character within said first data entry field while said virtual keyboard image is displayed; and d) accepting a third character according to one step of said b) and said c) and automatically displaying said third character within said first data entry field, wherein said b) and c) are both simultaneously and independently active for accepting manual data entry.

15. A method as described in claim 14 wherein said computer system is a portable computer system.

16. A method as described in claim 14 wherein said computer system is a palm sized computer system.

17. A method as described in claim 14 wherein said c) comprises:

recognizing alphabetic characters in a first region of said handwriting recognition pad; and recognizing alphabetic characters in a second region of said handwriting recognition pad.

18. A method as described in claim 14 further comprising transferring said first, second and third characters into a second data entry field, said second data entry field being generated by an application program that is executed on said computer system.

19. A method as described in claim 14 wherein said handwriting recognition pad comprises a button and wherein said a) is invoked in response to selection of said button by said stylus.

* * * * *